G. E. LUNDBERG.
BATTERY CONNECTOR.
APPLICATION FILED FEB. 3, 1920.
1,421,017.
Patented June 27, 1922.
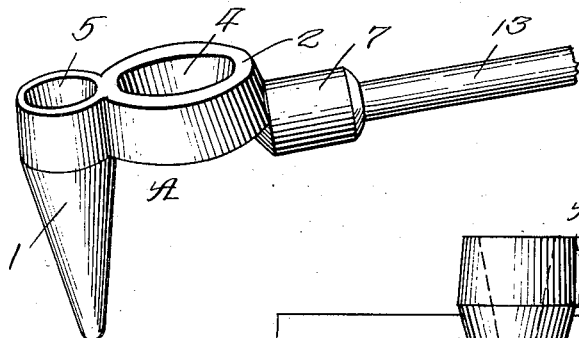
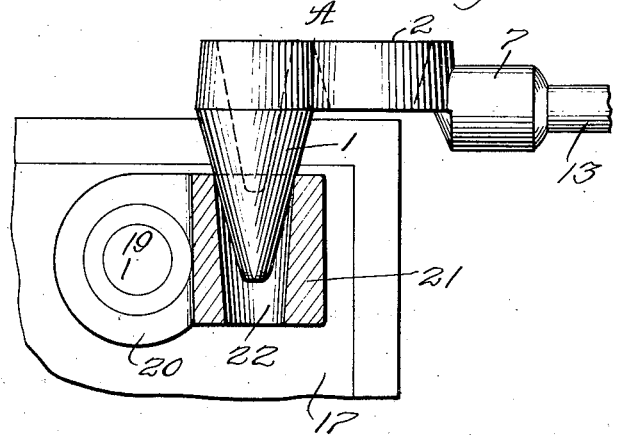
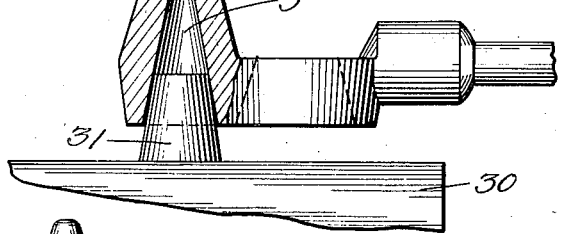
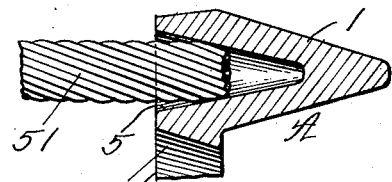
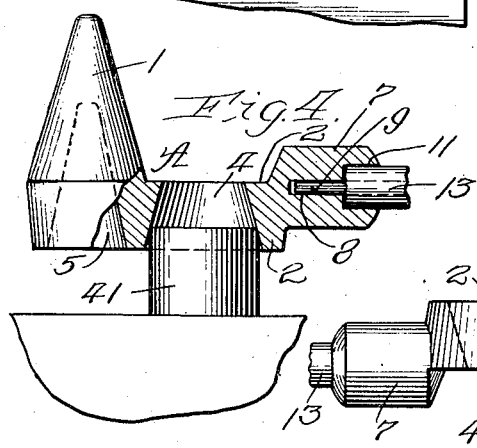
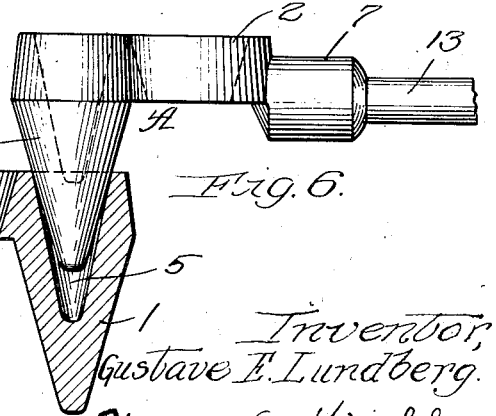
Inventor,
Gustave E. Lundberg.

UNITED STATES PATENT OFFICE.

GUSTAVE E. LUNDBERG, OF KEWANEE, ILLINOIS.

BATTERY CONNECTOR.

1,421,017.    Specification of Letters Patent.    Patented June 27, 1922.

Application filed February 3, 1920. Serial No. 355,951.

*To all whom it may concern:*

Be it known that I, GUSTAVE E. LUNDBERG, a citizen of the United States, residing at Kewanee, in the county of Henry and State of Illinois, have invented certain new and useful Improvements in Battery Connectors, of which the following is a specification.

This invention relates to improvements in battery connectors and is especially adapted for use at a charging station where automobile starting and lighting batteries of different makes with different kinds of terminals are brought in for charging. One of the features of the invention is the provision of a connector that can be easily and cheaply made, that is simple in construction and operation, and that is adapted for universal use with a large variety of battery terminals.

It is well known that there is a great variety of automobile starting and lighting batteries, such batteries being made of many sizes and designs. It is well known also that the terminals on such batteries are not standardized, such terminals being made in a great variety of shapes and sizes. At a charging station where such batteries are handled in great numbers it is desirable to use a connector that is readily adapted for quick and easy connection to and disconnection from the terminals of such batteries regardless of their design or shape. I have provided such a connector that is adapted for quick and easy connection to and disconnection from a large variety of battery terminals. My connector can also be easily and cheaply made; and is simple in construction and operation. My improved battery connector is also adapted to be readily attached to or detached from the end of a wire cable. It is also so constructed that two of such connectors can be attached together. These are valuable features since in connection with the charging of batteries it frequently is necessary in order to get extra length, to attach two or more charging wires together. This can easily be done by taking two or more wires, having one of my improved connectors on each end, and attaching the connectors to each other, thus getting any desired length of wire.

The features pointed out above, and others will be more apparent as I proceed with my specification.

In that form of device embodying the features of my invention shown in the accompanying drawings, Figure 1 is a view in perspective of my improved connector.

Figure 2 is a top plan view of my improved connector in use with a battery terminal of a certain type.

Figure 3 is a vertical sectional view of my improved connector in use with a battery terminal of a different type.

Figure 4 is a similar view of my improved battery connector in use with a battery terminal of still another type.

Figure 5 is a horizontal fragmentary sectional view of my connector attached to the end of a wire cable.

Figure 6 is a vertical sectional view of two of my improved battery connectors attached to each other.

My improved battery connector is preferably made of lead or an alloy of lead, since it has been found that lead resists to a greater extent than other metals the corrosive and disintegrating effects of the acids used in connection with storage batteries. It is obvious, however, that the connector may, without detracting from the spirit of this invention, be made of any other metal desired. I have found it most practical to form the connector by casting although it is obvious that it may be made in any other desired manner. As shown in the drawings, the connector is indicated by A, being cast in one piece, in shape resembling a hollow cone indicated by 1 with a ring 2 attached to the base of the cone. The hole 4 in the ring 2 is tapered (as best shown in Fig. 4) such taper forming substantially a continuation of the conical shaped hole 5 in the cone 1.

From the side of the ring 2 opposite the point where the cone 1 is attached the ring is provided with a boss 7 with an opening 8 therein adapted to contain the end of a conducting wire 9. The opening 8 is enlarged at its outer end as indicated by 11 to accommodate the rubber cover or other insulation 13 on the wire 9. The wire 9 is firmly fixed in the boss 7 by casting the material forming such boss around the wire, or by first inserting the wire and then squeezing the boss until the end of the wire is firmly clamped. It is obvious, that the wire may be fastened to the connector in a variety of other ways without detracting from the spirit of this invention.

In Fig. 2, I have shown a battery indicated by 17 with one of the ordinary forms of terminal. The battery 17 is provided with a post 19 on which is fixed an adaptor 20 with a part 21 containing the tapered hole 22. This form of terminal is extensively used; the tapered hole 22 being fashioned to accommodate a similar tapered piece on the end of the wire of the wiring system of the car adapted for permanent attachment to the battery. When it is desired to fasten my improved connector to such a terminal, the point of the cone 1 is inserted into the hole 22 as shown in Fig. 2, a slight pressure and twisting motion is given, and the connector is firmly fixed in the hole 22. As described above, the connector is preferably made of lead. For the same reasons that the connector is made of lead, as pointed out above, the terminals, posts and fittings on most batteries are also made of lead. The post 19 and the adaptor 20 as shown in Fig. 2 are made of lead in nearly all cases. Because of the fact that the adaptor 20 and my improved connector are both made of lead, which is a soft metal, the pressure and twisting motion described above will result in forming a firm connection between the two parts.

In Fig. 3 I have shown a battery with another form of terminal that is used to a considerable extent. As shown in this figure, the battery is indicated by 30 and the terminal by 31, such terminal being a short tapered lead post. When it is desired to attach the connector A to a terminal of such design, the hollow part of the cone 1 is used, such cone being forced down over the post as shown in Fig. 3 with a slight pressure and twisting motion resulting in forming a firm attachment between the post 31 and the connector A.

In Fig. 4 my improved connector is shown attached to a larger battery terminal post 41. This form of terminal is also used to a considerable extent on batteries. In attaching the connector to this post, the ring 2 is used, such ring being forced down over the post 41 with a slight pressure and twisting motion resulting in firmly attaching the post 41 in the tapered hole 4 in the ring 2.

In Fig. 5 I have shown the connector A attached to the end of a cable 51. This attachment is effected in the same way as the connector is attached to a post, such as the one shown in Fig. 3, the cable 51 being forced up into the hollow part of the cone 1 with a slight pressure and twisting motion.

In Figure 6 I have shown two of my connectors, one attached to the other. In doing this the cone of one connector is forced up into the hole in the cone of the other connector with a slight pressure and twisting motion resulting in firmly attaching the two connectors together.

Further advantages of my improved connector are as follows: No screw is required to hold the wire to the connector, no spring is required to hold the connector to the battery terminal, and there are no sharp pins or screws that are likely to make bad marks or mar the battery terminal.

In the practice of my invention I take a wire such as indicated by 13 about 2 feet in length, and attach one of my improved connectors to each end thereof.

I claim:

1. A battery connector terminal comprising a portion having a conical hollow therein and an internally tapered ring, the smallest internal diameter of said ring being substantially equal to the largest diameter of said hollow, the angle of the ring interior being substantially equal to the angle of the hollow.

2. A battery connector terminal comprising a portion having a conical exterior surface and having a conical hollow therein, the walls of the hollow being substantially parallel to the conical exterior surface whereby the terminal may be connected either internally or externally with other like terminals.

3. A battery connector terminal comprising a portion having a conical exterior surface and having a conical hollow therein, the walls of the hollow being the surface of a cone of substantially the same angle as the exterior surface of the portion and a ring attached to said portion adjacent its base, the interior of said ring being frusto conical and having its smallest diameter substantially equal to the largest diameter of said hollow and the angle thereof being substantially equal to the angle of said conical hollow.

In witness whereof, I have hereunto subscribed my name this 21st day of Jan., 1920.

GUSTAVE E. LUNDBERG.